US005784570A

United States Patent [19]
Funkhouser

[11] Patent Number: 5,784,570
[45] Date of Patent: Jul. 21, 1998

[54] SERVER FOR APPLYING A RECIPIENT FILTER AND COMPRESSING THE INPUT DATA STREAM BASED UPON A SET OF AT LEAST ONE CHARACTERISTICS IN A MULTIUSER INTERACTIVE VIRTUAL ENVIRONMENT

[75] Inventor: Thomas A. Funkhouser, Berkeley Heights, N.J.

[73] Assignee: AT&T Corp, Middletown, N.J.

[21] Appl. No.: 418,338

[22] Filed: Apr. 7, 1995

[51] Int. Cl.$^6$ .................................................. G06F 13/00
[52] U.S. Cl. ........................... 395/200.77; 395/200.3; 395/200.33; 395/200.65; 395/200.76; 341/51; 348/17; 348/402; 348/413; 382/107; 382/232
[58] Field of Search ....................... 341/51, 87; 348/18, 348/437, 402, 413, 416; 382/232, 233; 395/159, 250, 280, 500, 600, 115, 332, 200.3, 200.33, 200.65, 200.76, 200.77; 463/31; 345/158

[56] References Cited

U.S. PATENT DOCUMENTS

| 4,572,509 | 2/1986 | Sitrick ........................ 463/31 |
| 4,703,350 | 10/1987 | Hinman ...................... 348/402 |
| 4,714,996 | 12/1987 | Gladney et al. ............. 395/600 |
| 4,717,956 | 1/1988 | Moorhead et al. .......... 348/416 |
| 4,727,421 | 2/1988 | Koga ........................... 348/413 |
| 4,881,075 | 11/1989 | Weng ............................ 341/87 |
| 5,021,976 | 6/1991 | Wexelblat et al. .......... 395/159 |
| 5,133,063 | 7/1992 | Naito et al. .................. 395/500 |
| 5,181,181 | 1/1993 | Glynn .......................... 364/566 |

(List continued on next page.)

OTHER PUBLICATIONS

R. Kazman, "Load Balancing, Latency Management and Separation of Concerns in a Distributed Virtual World," Department of Computer Science, University of Waterloo, Waterloo, Ontario, Canada.

RKazman, "Making WAVES: On the Design of Architectures for Low-end Distributed Virtual Environments," Department of Computer Science, University of Waterloo, Waterloo, Ontario, Canada.

G. Singh et al., "BrickNet: Sharing Object Behaviors on the Net", Institute of Systems Science, National University of Singapore, Kent Ridge, Heng Mui Ken Terrace, Singapore.

M.R. Macedonia et al., "Exploiting Reality with Multicast Groups: A Network Architecture for Large-scale Virtual Environments," Computer Science Department, Naval Postgraduate School, Monterey, California.

T.A. Funkhouser et al., "Management of Large Amounts of Data in Interactive Building Walkthroughs," University of California at Berkeley.

S.J. Teller et al., "Visibility Preprocessing For Interactive Walkthroughs," Computer Graphics, vol. 25, 61–69 (Jul., 1991).

*Primary Examiner*—Thomas C. Lee
*Assistant Examiner*—Po C. Huang

[57] ABSTRACT

The present invention relates to a server for further reducing the amount of information that needs to be sent from the server to a set of user devices associated with a multiuser interactive virtual environment. More specifically, a method of operation of a set of at least one server initially comprises receiving an input data stream representing a set of at least one characteristic of a first entity. The first entity inhabits a first location within the multiuser interactive virtual environment and is associated with a first user device. Next, the set of at least one server applies a recipient filter to the input data stream to identify a set of at least one user device that will be sent an output message. The output message represents the input data stream. The set of at least one user device comprises a second user device. The recipient filter is based upon the set of at least one characteristic. The second user device is associated with a second entity. The second entity inhabits a second location within the multiuser interactive virtual environment. Next, the set of at least one server compresses the input data stream based upon the set of at least one characteristic to generate the output message. Finally, the set of at least one server transmits the output message to the second user device.

23 Claims, 2 Drawing Sheets

U.S. PATENT DOCUMENTS

| | | | |
|---|---|---|---|
| 5,241,625 | 8/1993 | Epard et al. | 395/502 |
| 5,408,619 | 4/1995 | Oran et al. | 395/280 |
| 5,432,870 | 7/1995 | Schwartz | 382/232 |
| 5,452,449 | 9/1995 | Baldwin, Jr. et al. | 395/600 |
| 5,454,051 | 9/1995 | Smith | 382/233 |
| 5,467,087 | 11/1995 | Chu | 341/51 |
| 5,481,297 | 1/1996 | Cash et al. | 348/13 |
| 5,491,780 | 2/1996 | Fyles et al. | 395/332 |
| 5,493,728 | 2/1996 | Solton et al. | 395/250 |
| 5,502,489 | 3/1996 | Kim et al. | 348/607 |
| 5,523,793 | 6/1996 | Fujita et al. | 348/437 |
| 5,539,865 | 7/1996 | Gentile | 395/115 |
| 5,598,187 | 1/1997 | Ide et al. | 345/158 |

SERVER FOR APPLYING A RECIPIENT FILTER AND COMPRESSING THE INPUT DATA STREAM BASED UPON A SET OF AT LEAST ONE CHARACTERISTICS IN A MULTIUSER INTERACTIVE VIRTUAL ENVIRONMENT

RELATED APPLICATION

This application is related in subject matter to, and incorporates by reference as if set forth in its entirety, U.S. patent application Ser. No. 08/418,329 entitled "Method Of And Apparatus For Transmitting Voice Messages In A Multiuser Interactive Virtual Environment", pending filed of even date herewith and assigned to the assignee of the present invention.

1. Field Of The Invention

The present invention relates to communication servers. More specifically, the present invention relates to communication servers for a multiuser interactive virtual environment.

2. Background Of The Invention

A multiuser interactive virtual environment may be used to play a multiuser interactive game ("MIG"). The MIG may be played by a set of players associated with a set of user devices. The set of user devices communicates with a server. The set of user devices is also associated with a set of entities that inhabit locations within the multiuser interactive virtual environment ("MIVE"). The set of entities may be thought of as a set of gamepieces of the MIG similar in nature to gamepieces such as "the dog" and "the shoe" in the well known Monopoly® brand board game.

In a MIG, the amount of bandwidth available between the server and a user device is at a premium. This is because a typical user device that communicates with the server is simply a personal computer ("PC") and a modem.

However, when only two players (e.g., player A and player B) are playing a MIG there is enough bandwidth between the server and a user device for each player to send signals to each user device from the server and vice versa. This is because a given user device (e.g., user device A) need only be updated as to status of one other entity (e.g., entity B) within the MIG. Thus, a display unit of, e.g., user device A displays an image representative of the updated status of, e.g. entity B. For example, the display unit may show a new location of entity A.

However, if numerous players (e.g., 100 players) are playing a MIG, a bandwidth problem may arise. This is because the baud rate of a modem at many user devices may be insufficient to receive signals quickly enough to allow the personal computer to process the signals relating to the movement of 99 other players transmitted to the modem by the server. Clearly, as the number of players increases, the problem becomes more acute. As a result, important signals may become lost, delayed or distorted due to increased error rates.

In attempting to address the bandwidth problem in a MIG, Kazman, R. *Load Balancing, Latency Management, And Separation Of Concerns In A Distributed Virtual World*, Department Of Computer Science, University of Waterloo, Waterloo, Ontario, Canada N2L 3G1 (available on the internet via anonymous file transfer protocol at "schmance.cs.uwaterloo.ca") mentions the use of filtering techniques, such as visual occlusion techniques, as a possible solution. It should be apparent that for some players (e.g., player A) at a user device there is at least one entity (e.g., entity A) that inhabits the multiuser interactive virtual environment. Essentially, in these techniques the server determines which of the other 99 entities can been "seen" by entity A. For example, entity A may not be able to see entity B because, within the MIG, entity B and entity A may be separated by a wall. After the server has determined which entities in the set of other 99 entities that entity A can see, the server sends only those signals to player A's user device that relate to actions of the entities that can be seen by entity A.

However, in numerous applications, even if filtering techniques are implemented, there is not enough bandwidth.

SUMMARY OF THE INVENTION

The present invention relates to a server for further reducing the amount of information that needs to be sent from the server to a set of user devices associated with a multiuser interactive virtual environment. More specifically, a method of operation of a set of at least one server initially comprises receiving an input data stream representing a set of at least one characteristic of a first entity. The first entity inhabits a first location within the multiuser interactive virtual environment and is associated with a first user device. Next, the set of at least one server applies a recipient filter to the input data stream to identify a set of at least one user device that will be sent an output message. The output message represents the input data stream. The set of at least one user device comprises a second user device. The recipient filter is based upon the set of at least one characteristic. The second user device is associated with a second entity. The second entity inhabits a second location within the multiuser interactive virtual environment. Next, the set of at least one server compresses the input data stream based upon the set of at least one characteristic to generate the output message. Finally, the set of at least one server transmits the output message to the second user device.

Advantageously, in addition to applying a recipient filter to the input data stream, the server made and operated in accordance with the present invention compresses the input data stream to generate the output message, thereby allowing for more effective use of the bandwidth between the server and the set of at least one user device to whom it will transmit the output signal.

Also advantageously, the method performed by the server requires less local memory of the second user device.

Also advantageously, the method performed by the server requires less processing power of the second user device.

Other advantages of the present invention will become apparent from the remainder of this specification.

DETAILED DESCRIPTION

Introduction:

The present invention will be described in the context of a MIG being played in a MIVE. As used herein, MIVE shall mean an environment that permits a set of players, via a set of user devices and a server, to be given an experience of being associated with a set of entities which simultaneously inhabit a shared environment wherein at least a portion of the shared environment is displayed on a display device of each user device of each player in the set of players. Also, the terms "entity" and "user" are employed interchangeably herein. Thus, e.g., the third user in the MIVE is the same as the third entity in the MIVE.

MIG systems typically have a set of at least one server (hereinafter referred to collectively as "the server"). The server is adapted to communicate with a set of user devices. Each player of the MIG operates a corresponding user device in the set of user devices in order to communicate with the server and other players. Each user device being operated by an active player has a corresponding entity which inhabits a location within the MIVE.

Figure 3:
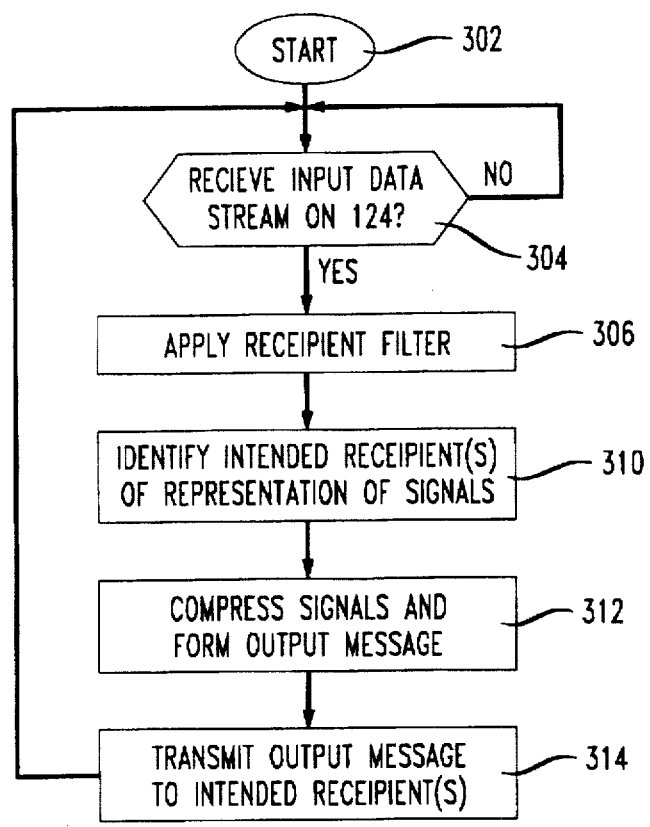
FIG. 3 is a flowchart describing the operation of the server of FIG. 1.

For clarity of explanation, the methods described with respect to FIG. 3 make use of functional boxes denoted by reference numerals. The functions executed in these boxes may be provided through the use of either shared or dedicated hardware, including, but not limited to, hardware capable of executing software. These functions may be implemented by a "processor" or multiple "processors." Thus, use of the term "processor" and forms thereof should not be construed to refer exclusively to hardware capable of executing software.

The manner in which the server receives an input data stream, processes the input data stream to generate the output message, and transmits the output message will now be described with reference to FIGS. 1 through 4.

Figure 1:
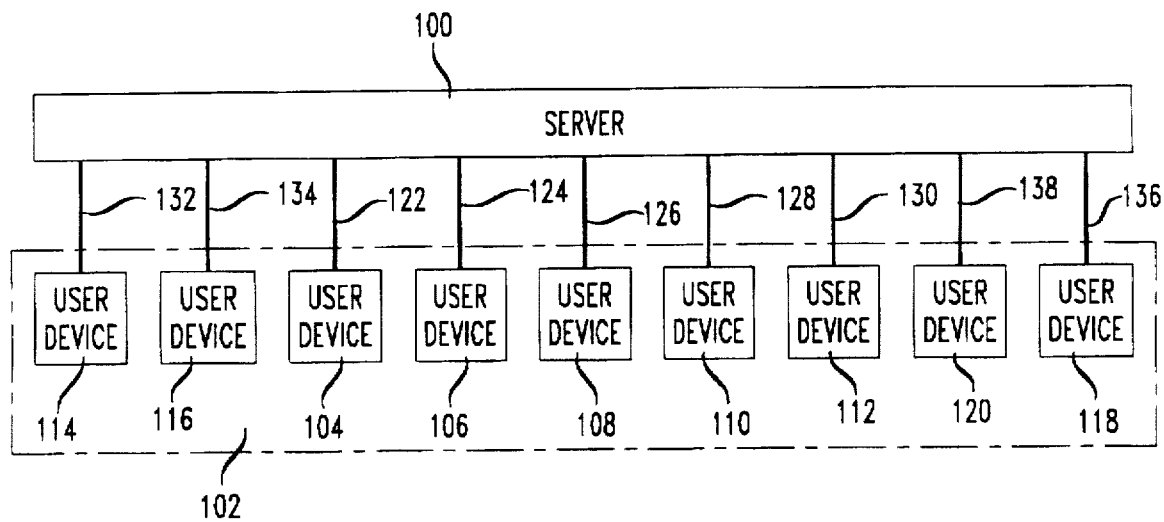
FIG. 1 is a diagram of a system in which a server in accordance with the present invention may be operated.

Illustrative Embodiment:

Referring to FIG. 1, a server 100 is shown connected to a set of user devices 102 comprising user devices bearing reference numerals 104 through 120 (even numbers only). Each user device in the set of user devices 102 is adapted to communicate with the server 100 via its respective communication channel (bearing reference numerals 122 through 138, even numbers only) as shown (collectively referred to as a set of communication channels 140). Illustratively, the set of communication channels 140 is a set of telephone lines. However, those skilled in the art will appreciate different environment (e.g., interactive television environments) in which the invention may be used and the different possible set of communication channels 140 (e.g., fiber optic cables, coaxial cables, wireless communications, and/or a combination thereof) that may be used. The set of user devices 102 comprises a first user device 104, a second user device 106, a third user device 108, a fourth user device 110, and a fifth user device 112. To facilitate the clarity of the description, the illustrative embodiment will describe how the server reduces the amount of information needed to be sent to the first user device 104, the second user device 106, the third user device 108, the fourth user device 110, and/or the fifth user device 112 when the same are involved in a MIG.

The server 100 must send an output message to, e.g., the second user device 106. The amount of information in the output message that is sent to the second user device 106 depends upon an input data stream from, e.g., the first user device 104 and the compression technique used to compress the input data stream to generate the output message. However, the fact that the second user device 106 will receive the output message based upon the input data stream from the first user is determined by application of a recipient filter to the input data stream. There may be other input data streams from, e.g., the fourth user device 110 that are compressed but not sent to the second user device 106.

Instead, they are, e.g., sent to other user devices such as the fifth user device 112.

The server 100 may use many different types of recipient filters. Each recipient filter is based upon a set of at least one characteristic of the user associated with the user device that is sending the input data stream. In the present example, the first user 201 (i.e. first entity) is associated with the first user device 104 that is sending the input data stream. Illustratively, the recipient filter applies visual occlusion techniques. However, those skilled in the art will realize that there are many other characteristics of the user that may be used in the recipient filter.

Figure 2:
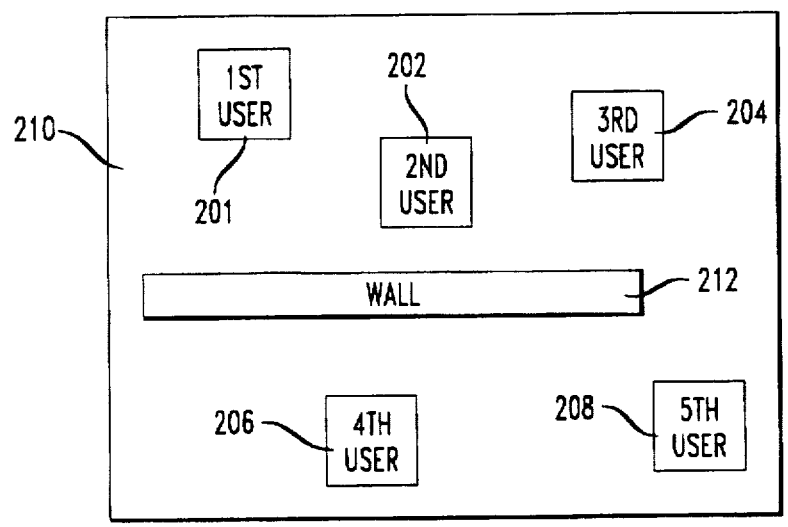
FIG. 2 is an illustration of a multiuser interactive virtual environment that may be associated with the present invention.

Referring to FIGS. 1 and 2, the first user device 104, the second user device 106, the third user device 108, the fourth user device 110, and the fifth user device 112 are associated with a set of users 200 (reference numeral not shown) comprising a first user 201, a second user 202, a third user 204, a fourth user 206, and a fifth user 208, respectively, as shown in FIG. 2. The set of users 200 (i.e., the set of entities) are, e.g., "players" of the MIG as they inhabit the MIVE 210. They are not the same as users/operators/subscribers (e.g., human beings) that operate the set of user devices 102. Also, the MIVE 210 is comprised of a wall 212. Users cannot "see" through the wall 212. As used herein in the context of visual occlusion a user can "see" another user if a straight line may be drawn from the user to the other user that does not pass through the wall. Thus, as shown if FIG. 2, the following table is illustrative:

TABLE I

| User: | Users that can be seen: |
|---|---|
| first user 201 | second user 202 and third user 204 |
| second user 202 | first user 201 and third user 204 |
| third user 204 | first user 201, second user 202, and fifth user 208 |
| fourth user 206 | fifth user 208 |
| fifth user 208 | third user 204 and fourth user 206 |

As mentioned above, there are numerous types of recipient filters that may be applied to an input data stream. However, each type of recipient filter identifies a set of at least one user device that will be sent an output message.

Each user device in the set of at least one user device is an "intended recipient" of the output message. As used herein, "intended recipient" shall mean a user for which receipt of the output message effects the execution of a user device (from the set of user devices) associated with the user in a manner that is perceivable to the user. Those skilled in the art will realize that there may be numerous intended recipients of a given output message. For example, if visual occlusion is the manner by which intended recipients are determined, two user devices that are able to "see" the same users in the MIVE 210 are intended recipients of the same output message. This may occur if, e.g., user device A can see only users C and D and user device B can see only users C and D.

Examples of intended recipients based upon a recipient filter using visual occlusion techniques may be illustrated with respect to FIG. 2 and TABLE I. Each user (e.g., the first user 201) in the set of users 200 is capable of seeing a subset of users (e.g., the second user 202 and the third user 204) whose users are also capable of seeing it (e.g., the first user 201). The subset of users may, in fact, be the null set (although no such user exists in FIG. 2). The subset of users for each user in the set of users 200 is shown in TABLE I. In other words, the second column lists the users that can see the user in the first column. Thus, if the user in the first column moves to a different location in the MIVE 210, each user device associated with each user in the second column must be notified so that the location of the user in the first column may be updated (e.g., on a visual display terminal of a user device). For example, if the first user 201 moves within the MIVE 210, the second user 202 and the third user 204 must be notified via an output message from the server. Therefore, the second user 202 and the third user 204 may be thought of as an "intended recipients." Another example is one wherein the second user 202 moves. In this case, the first user device 104 and the third user device 108 must be notified. Similarly, if the third user 204 moves, the first user device 104, the second user device 106 and the fifth user device 112 must be notified. The first user device 104 must, therefore, be notified of the movement of both the second user 202 and the third user 204. Notification is provided to each intended recipient in the form of an output message. Those skilled in the art will appreciate that, e.g., when the second user 202 moves, the server 100 need not notify the fourth user device 110 and the fifth user device 112 in real-time regarding the new position of the first user 201.

Again referring to FIG. 2, instead of determining which users a given user can see in real time, other known methods may be used. For example, the MIVE 210 comprises "cells" of different area. Each cell may represent, e.g., a room in a MIVE 210 that represents a house or other building. The visibility of each cell (i.e., the areas in the MIVE 210 that is it possible to see from the cell) may be precomputed for the MIVE. The server 100 may consider updating, e.g., the first user device 104 based upon the visibility of the cell in which the first user 200 is located as opposed to the less inclusive case of updating the first user device 104 based upon the location of the first user 200 within the cell. Such techniques were disclosed in Teller, S. J., and Sequin, C. H., *Visibility Preprocessing for Interactive Walkthroughs*, Computer Graphics (SIGGRAPH'91), 25, 4, pp. 61–69 and Funkhouser, T. A., Sequin, C. H., and Teller, S. J. *Management of Large Amounts of Data in Interactive Building Walkthroughs*, ACM SIGGRAPH Special Issue on 1992 Symposium on Interactive 3-D Graphics, Cambridge, Mass., 1992, pp. 11–20 (hereinafter collectively referred to as "the literature cited above"). Although the visible areas identified by the precomputed method disclosed in the above identified literature is conservatively over estimated, it allows the server the advantage of identifying intended recipients by using "look up" tables rather than extensive ongoing computations.

Those skilled in the art will also appreciate that the recipient filter may be defined by other characteristics such as sound. This is particularly useful for MIGs wherein users in the set of users have both a visual and audio interface with each other. For example, the fourth user 206 may not be able to "hear" the second user 202 due to the wall 212. However, the fourth user 206 may be able to hear the third user 204 due to their proximity (even though the fourth user 206 cannot "see" the third user 204). FIG. 3 is a flowchart describing the operation of the server of FIG. 1. The operation will be described with reference to the server 100 transmitting an output message to the first user device 104, via communication channel 122, based upon movement of the second user 202.

Again referring to FIG. 3, box 302 may be thought of as the initialization of a MIG. After initialization, users begin to move around the MIVE 210. Box 304 determines if the server 100 has received an input data stream (e.g., signals) via communication channel 124. If the server 100 has not yet received signals, the server 100 simply waits. However, if the server 100 has received signals, the server 100 applies the recipient filter to the signals. This is shown in box 306. As shown in box 310, the recipient filter identifies the set of at least one user device (e.g., intended recipient(s)) that will receive the output message. This may be done by using visual occlusion techniques as discussed above with reference to FIG. 2. In this instance, the intended recipients would be the first user device 104 and the third user device 108. However, for ease of explanation, the present example is limited to transmitting the output message to the first user device 104 based upon movement of the second user 202.

Still referring to FIG. 3, the server 100 compresses the input data stream and forms the output message as shown in box 312. The input data stream may, e.g., represent a time ordered position of the second user 202 within the MIVE 210. The time ordered position may be generated by, e.g., movement of a joystick which is part of the second user device 106. For example, if the MIVE 210 is in a two dimensional MIVE (as shown in FIG. 2), for a given second of time, the time ordered position of the second user 202 may be represented as:

$$f(\text{second user 202 position})=(x1, y1), (x2, y2), \ldots, (xN, yN) \quad (1)$$

wherein the second user device 106 has the ability to communicate N different positions to the server 100 each second. Suppose, for example, that:

$$x1=x2=\ldots=xN \quad (2)$$

and $$y1>y2>\ldots>yN \quad (3)$$

The server 100 can determine that the second user 202 is moving in a straight line. This enables the server 100 to send the first user device 104 an output message that comprises a direction, a velocity, and an acceleration (i.e., three pieces of information) (as opposed to N messages having both an x and y coordinate). Thus, the input data stream is compressed since the output message will comprise, e.g., a direction, a velocity, and an acceleration of the second user 202 as opposed to N different (x, y) coordinates of the second user 202. The server 100 forms the output message as shown in box 312. Finally, the output message is transmitted to the intended recipient(s) as shown in box 314, which in this example is the first user device 104. Those skilled in the art will realize that more compression is achieved as N becomes larger.

Figure 4:
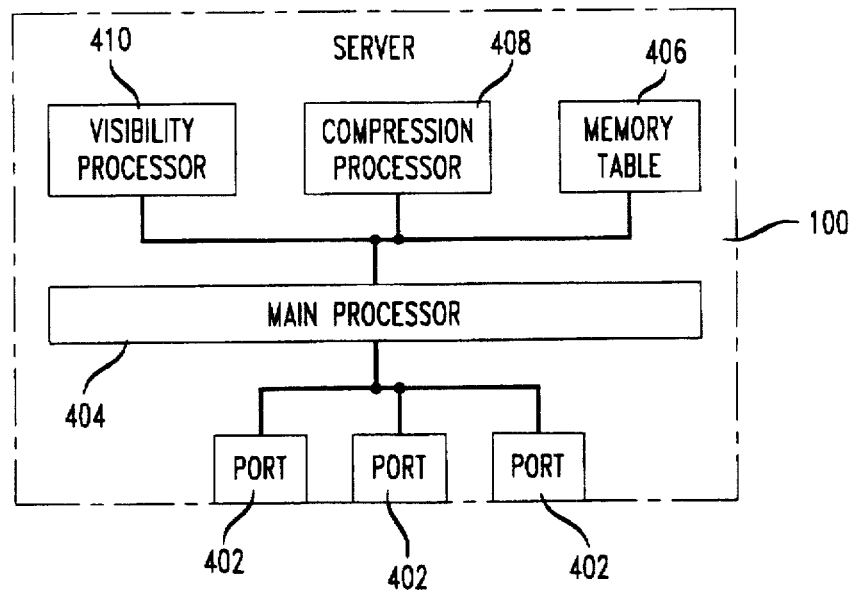
FIG. 4 is a more detailed diagram of the server of FIG. 1.

FIG. 4 is a more detailed diagram of the server of FIG. 1. The server 100 comprises a plurality of ports 402, a main processor 404, a memory table 406, a compression processor 408, and a visibility processor 410 all coupled together as shown. The visibility processor 410 is a type of recipient filter. Each port in the plurality of ports 402 may interface with multiple user devices from the set of user devices 102. The plurality of ports 402 is coupled to the main processor 404. This may be accomplished with a multiplexer.

Again referring to FIG. 4, the responsibility of the main processor 404 is to manage the flow of information into and out of the server 100. Upon receipt of the input data stream from the second user 202, the main processor forwards the input data stream to the visibility processor 410 and the compression processor 408.

Yet again referring to FIG. 4, the visibility processor 410 determines if the input data stream, which represents, e.g., a time ordered position of the second user 202, is related to movement of the second user 202. Thus, the input data stream may be thought of as a sequence of messages.

Assuming that the sequence of messages is related to movement, the visibility processor 410 determines a set of cells within the MIVE 210 into which the second user 202 travelled. Based upon the set of cells, the visibility processor 410 accesses the memory table 406 to determine the intended recipients. The table may be similar in nature to TABLE I except that the columns would list cells rather than users. Further, the memory table 406 may be generated in accordance with the literature cited above. The visibility processor 410 identifies the intended recipients to the main processor 404.

Still referring to FIG. 4, the compression processor 408 analyzes the sequence of messages. Based upon the analysis, the compression processor 408 forms a set of characteristics of the second user 202. Illustratively, the set of characteristics includes the direction, the velocity, and the acceleration of the second user 202. The direction may range (in two dimensions) from zero to 360 degrees. The velocity and acceleration are real numbers. Finally, the compression processor 408 transmits the set of characteristics to the main processor 404.

Again referring to FIG. 4, the main processor receives the set of characteristics from the compression processor 408 and the intended recipients from the visibility processor 410. Based upon this information, the main processor 404 transmits the output message to the set of intended recipients via the appropriate port(s) in the plurality of ports 402. This may be accomplished with a demultiplexer.

Yet again referring to FIG. 4, the server 100 has been described as receiving a sequence of messages representing a sequence of locations of a second user. The server 100 may, in fact, receive a sequence of messages from a number of different user devices in the set of user devices 102 relating to a number of different users. In this case, synergies may be realized. For example, if the second user 202 and another user (e.g., the third user 204) for which the server receives a sequence of messages are "flying in formation" (e.g., both the second user 202 and the third user 204 are airplanes in formation in the MIVE 210), the main processor 404 will realize this and adjust the output message to the first user device 104. More specifically, since the second user 202 and the third user 204 would be flying in the same direction, at the same velocity, and at the same acceleration, (all within certain respective error tolerances) the main processor 404 would transmit an output message with only one direction, only one velocity, and only one acceleration and inform the first user device 104 to apply these characteristics to both the second user 202 and the third user 204 when updating its visual display. Those skilled in the art realize that as the "flying formation" gets larger, more efficiency is achieved. Also, even though velocities, directions, and accelerations may not match exactly, a savings in bandwidth may be realized even if one characteristic in the set of characteristics of the second user 202 matches a corresponding characteristic in the set of characteristics of the third user 204. Finally, even though velocities, directions, and accelerations may not match exactly, a savings in bandwidth may be realized if, e.g., the main processor 404 determines that the difference in a characteristic between, e.g., the second user 202 and the third user 204 is small enough to be perceptually insignificant to a viewer located near the display terminal of the first user device 102. These differences could be linked to the error tolerances as mentioned above.

Those skilled in the art will appreciate that many variations to the above described illustrative embodiment may be implemented. For example, first, the MIVE 210 may be two dimensional, three dimensional, or even N dimensional. Second, the signals representing the sequence of locations of the second user 202 could be signals from a number of different input devices at the locale of the second user device 106 such as a joystick, a keyboard button or buttons, a remote control device, etc. . . and/or other items known to those skilled in the art. Third, the signals representing the sequence of locations of the second user 202 need not be self contained signals. In other words, each signal need not be an x and a y coordinate. Instead, the signals could represent "move one pixel to the right" or "move 3 pixels in a northwest direction." Fourth, depending upon movement of the second user 202, the minimum information needed by the first user device 104 to accurately display the location of the second user 202, and the accuracy of a portion of the MIVE 210 being displayed at the first user device 104, compression may be done in numerous manners. For example, slight movements back and forth may be ignored. Also, complex movements may be simplified to circular movements, zigzag movements, etc. . . as appropriate. The appropriateness of such simplifications may be dictated by such factors as distance from the first user 201 to the second user 202. For example, assuming two users can see each other in the MIVE 210, the closer the users are, the more desirable it is to he able to show the details of movements of one user to another. Also, simplifications may be based upon available bandwidth from the server 100 to the first user device 104. In this sense, the server 100 may customize the level of detail sent each intended recipient so as to maximize bandwidth utilization. In other words, the server 100 may set up differing levels of information that it will send to different user devices in the set of at least one user device based upon the bandwidth available to the particular user device. For example, as explained above, slight movements back and forth may be ignored. However, if the server 100 determines that enough bandwidth is available, the first user device 104 may be able to receive an output message that will enable it to display, as opposed to ignore, the slight movements of the second user 202. Fifth, although FIG. 1 is shown as having a single server, those skilled in the art will appreciate that the server 100 may be comprised of a number of different servers in communication with each other. Sixth, the set of at least one characteristic may comprise a change in size, shape, and/or color of the second user 202, a team on which the second user 202 is placed for purposes of the MIG, and/or other characteristics that will be apparent to those skilled in the art. Seventh, those skilled in the art will realize that the step of compressing the input data stream may be done after, concurrently with, or prior to the application of the recipient filter. This is because the recipient filter does not alter the input data stream but instead, simply identifies the set of a least one user device to which an output message representing the input data stream will be transmitted. Eighth, the invention could be implemented in environments such as interactive television environments. Ninth, the invention could be used in applications other than MIGs such as home shopping, collaborative design, network social groups, education, and training and simulation. Tenth, although the illustrative embodiment has been described with respect to applying a recipient filter and compressing, one may practice the invention simply by compressing in certain manners. An example of such a manner of compression was described with respect to the input data stream comprising a sequence of messages representing a sequence of locations and determining the location, velocity, and acceleration therefrom. Eleventh, a user or player may be controlled by a processor rather than a human being. Twelfth, another type of compression may be based upon the state of a set of entities. For example, in the "flying in formation" example above, one might be able to send a message stating that the entire formation has been blown up as opposed to sending individual messages for each entity in the formation. Thus, the invention is defined by the appended claims.

What I claim is:

1. A method of operation of a server comprising:
   (a) receiving an input data stream representing a set of at least one characteristic of a first entity, said first entity inhabiting a first location within a multiuser interactive virtual environment and being associated with a first user device;
   (b) applying a recipient filter to said input data stream to identify a set of at least one user device that will be sent an output message representing said input data stream, said set of at least one user device comprising a second user device, said recipient filter being based upon said set of at least one characteristic, said second user device being associated with a second user inhabiting a second location within said multiuser interactive virtual environment;
   (c) compressing said input data stream based upon said set of at least one characteristic to generate said output message; and
   (d) transmitting said output message to said second user device.

2. The method of claim 1 wherein said step of applying said recipient filter comprises applying a visual occlusion filter.

3. The method of claim 1 further comprising:
   (a) receiving an additional input data stream representing an additional set of at least one characteristic of a third entity, said third entity inhabiting a third location within said multiuser interactive virtual environment and being associated with a third user device;
   (b) applying said recipient filter to said additional input data stream to identify an additional set of at least one user device;
   (c) determining that said second user device is in said additional set of at least one user device; and
   (d) comparing said set of characteristics with said additional set of characteristics to generate a comparison wherein said output message is also based upon said comparison and said additional set of characteristics.

4. The method of claim 1 further comprising transmitting said output message to an additional intended recipient.

5. The method of claim 1 wherein said set of at least one characteristic comprises a velocity value.

6. The method of claim 1 wherein said set of at least one characteristic comprises an acceleration value.

7. The method of claim 1 wherein said set of at least one characteristic comprises a direction value.

8. The method of claim 1 wherein said set of at least one characteristic comprises a color value.

9. The method of claim 1 wherein said set of at least one characteristic comprises a size value.

10. The method of claim 1 wherein said set of at least one characteristic comprises a shape value.

11. The method of claim 1 wherein said set of at least one characteristic comprises a description of a behavior of an entity.

12. The method of claim 1 wherein said set of at least one characteristic comprises a description of a behavior of a group of entities.

13. A set of at least one server comprising:
   (a) means for receiving an input data stream representing a set of at least one characteristic of a first entity inhabiting a first location within a multiuser interactive virtual environment and being associated with a first user device;
   (b) a recipient filter for identifying a set of at least one user device that will be sent an output message representing said input data stream, said set of at least one user device comprising a second user device, said recipient filter being based upon said set of at least one characteristic and being responsive to said input data stream, said second user device being associated with a second user inhabiting a second location within said multiuser interactive virtual environment;
   (c) processor means for compressing said input data stream based upon said set of at least one characteristic to generate said output message; and
   (d) means for transmitting said output message to said second user device.

14. The set of at least one server of claim 13 wherein said recipient filter comprises a visual occlusion filter.

15. The set of at least one server of claim 13 wherein said set of at least one characteristic comprises a velocity value.

16. The set of at least one server of claim 13 wherein said set of at least one characteristic comprises an acceleration value.

17. The set of at least one server of claim 13 wherein said set of at least one characteristic comprises a direction value.

18. The set of at least one server of claim 13 wherein said set of at least one characteristic comprises a color value.

19. The set of at least one server of claim 13 wherein said set of at least one characteristic comprises a size value.

20. The set of at least one server of claim 13 wherein said set of at least one characteristic comprises a shape value.

21. The set of at least one server of claim 13 wherein said set of at least one characteristic comprises a description of a behavior of an entity.

22. The set of at least one server of claim 13 wherein said set of at least one characteristic comprises a description of a behavior of a group of entities.

23. A set of at least one server comprising:
   (a) means for receiving in a server a sequence of messages representing a sequence of locations of a first entity inhabiting a multiuser interactive virtual environment and being associated with a first user device in communication with said server;
   (b) means for modifying said sequence of messages by:
      (i) identifying a time ordered set of at least three locations from said sequence of locations, said time ordered set of at least three locations comprising a first location, a second location, and a third location;
      (ii) determining a first set of at least one characteristic by comparing said first location with said second location;
      (iii) determining a second set of at least one characteristic by comparing said second location with said third location;
      (iv) identifying a common characteristic between said first set of at least one characteristic and said second set of at least one characteristic; and
      (v) based upon said common characteristic, forming an output message representative of said sequence of messages; and
   (c) means for transmitting said output message to a second user device in communication with said server, said second user device being associated with a second entity which inhabits said multiuser interactive virtual environment.

* * * * *